3,386,749
SURFER'S SULKY
Georges Roudanez, Lawndale, Calif.
(26004 Narbonne Ave., Lomita, Calif. 90717)
Filed Oct. 22, 1965, Ser. No. 501,649
6 Claims. (Cl. 280—47.3)

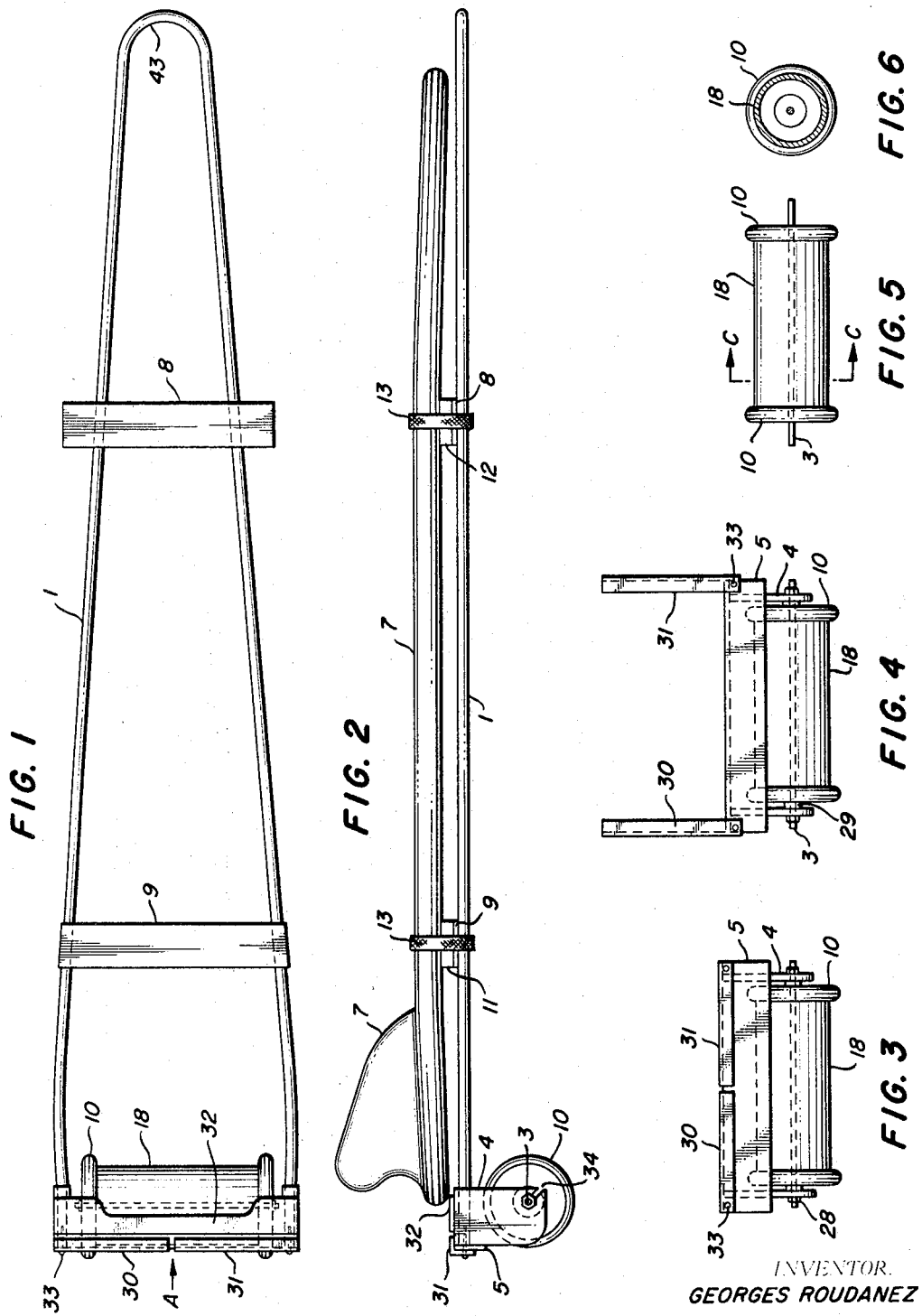

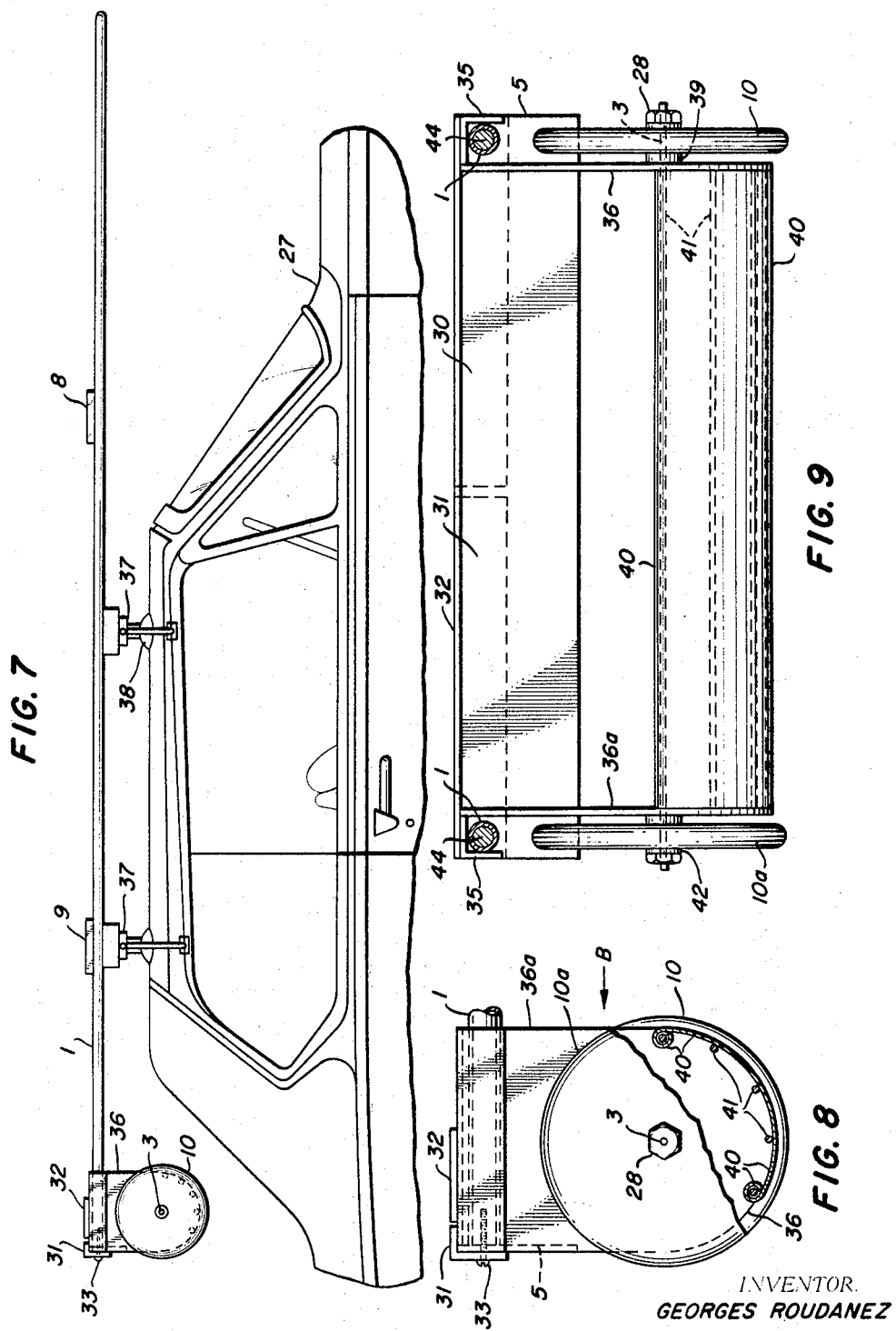

ABSTRACT OF THE DISCLOSURE

The invention contemplates a sulky, or cradle for the protection and preservation of a surfboard at all times when the surfboard is not in the water. Said device comprises an elongated light weight metal tubular frame shaped exclusively for the resilient mounting of a surfboard thereon. The forward end of said frame arched so as to provide a pulling handle. Two narrow rubber tired wheels mounted at the rear end of said frame and which are freely rotatable around its axle for travel over hard surfaces, and additional means permitting said device to travel over soft surfaces. A pair of levers adjustably rotatable 90° outward from a folded horizontal position to a vertical position in relation to the axis of the device, said outward position of the levers enables the device with surfboard mounted thereon to stand in vertical position in relation to the ground. The device with surfboard mounted thereon can be strapped to any already known luggage carrier atop an automobile.

*Cross reference to related application*

See applicant's application; Ser. No. 470,959, filed July 7, 1965; title—Surfboard Buggy.

The invention relates to a new and unique device to convey a surfboard to and from the sea water's edge. The invention contemplates the provision of novel methods and means adaptable to ease the conditions encountered by a surfer in carrying his surfboard from its storage location to the sea water's edge at the beaches. In the event the surfboard's storage location is within walking distance from the beach, the device with the surfboard mounted thereon is manually pulled to and from its destination, or, in the event the surfboard's location is far from the beaches the device with the surfboard mounted thereon can be mounted on the already known luggage carrier on top of an automobile to a parking area within walking distance to the beach, the device with surfboard mounted thereon is removed from the luggage carrier and manually pulled over either hard or sand surfaces to and from the water's edge.

The present method of bringing a surfboard to the water's edge of the beach is limited to the strenuous and tiresome task whereby the surfer must carry the surfboard under his arm or drag one end of the surfboard over the sand or pavement, or by balancing the surfboard on top of his head. This is usually a difficult task for the short arm surfer, the lady surfer or the younger surfer. The dragging of a surfboard over either sand or paved surfaces will damage the surfboard considerably.

It is an object of this invention to provide a wheeled device to carry a surfboard mounted thereon on rubber tired wheels, thus permitting the surfer to easily manually pull the device to and from the sea water's edge.

A still further object of the invention is to provide, in combination, a plurality of hard rubber tired wheels for hard surface travel, such as hard road or paved surfaces, and a wide elongated cylinder fixedly attached to the rubber-tired wheels and which in turn function as a wheel capable of travel over soft surfaces, such as sand, thus, permitting the surfer to easily manually pull the device with the surfboard mounted thereon to and from the water's edge.

A still further object of the invention permits the device with the surfboard mounted thereon to be carried on the top of an automobile by strapping the frame of the device to any of already known automobile luggage carriers.

A still further object of the invention is to provide means permitting the storage of the device with surfboard mounted thereon in space saving upright vertical position.

A still further object of the invention is to provide resilient pads attached to the device so as to eliminate damage to the surfboard when mounted on the device.

Another object of the invention is to provide strapping arrangement to firmly secure the surfboard to the device.

Another object of the invention permits the device with surfboard mounted thereon to be hung horizontally from the wall of its storage location when not in use.

An important object of the invention is that the device provides protection and preservation of the surfboard at all times except when the surfboard is in the water.

Another object of the invention offers a substitute means for soft surface travel, such as sand, etc., by incorporating a wide skid or slide plate of light weight metal to the device in lieu of the wide cylinder wheel described above, thus permitting the device to skid or slide over the sand instead of rolling over the sand.

Other objects and advantages of the invention herein disclosed and described will be obvious to the art.

To this end my invention consists of the novel construction, arrangement and combination of parts herein shown and described, and more particularly pointed out in the claims.

In the drawings wherein like references and character indicate like, similar or corresponding parts:

FIG. 1 illustrates a top view of the invention.

FIG. 2 illustrates a side or elevational view of the device with a surfboard mounted thereon.

FIG. 3 illustrates a rear view of the device looking in the direction of A of FIG. 1, showing the back plate 5 on which is mounted two rotatable levers 30 and 31 which permits vertical standing of the device.

FIG. 4 illustrates the device described in FIG. 3 but showing the two rotatable levers 30 and 31 in open position.

FIG. 5 illustrates the two rubber tired wheels 10 to which is fixedly attached to wide cylinder wheel 18 which in combination provide rotatable means for either hard paved surfaces or sand surfaces.

FIG. 6 illustrates in section the wide cylinder wheel 18 at C—C of FIG. 5.

FIG. 7 illustrates the device mounted on the top of an automobile. It also illustrates optional means for the device to travel over sand surfaces utilizing a skid or slide plate instead of the wide cylinder wheel arrangement illustrated in FIG. 6.

FIG. 8 is an enlarged view of the optional means for said travel illustrated in FIG. 7.

FIG. 9 illustrates a front view of the optional means for sand travel looking in the direction of B of FIG. 8.

Now, referring to the drawings which illustrates embodiments of the invention. FIG. 1 shows a top view of the device, which consists the main frame 1 to which is fixedly attached the surfboard 7 (FIG. 2) support plates 8 and 9, also the top retaining plate 32 as well as the back plate 5 FIG. 2 and shaft 3 supporting plates FIG. 2 to which is mounted the rubber tired wheels 10. The view also illustrates the mounting location of the rotatable levers 30 and 31. Also illustrated in FIG. 1 is the location of the pulling handle 43 which is an integral part of frame 1. The elevational view of the device with the surfboard mounted thereon as is illustrated in FIG. 2 shows the main frame 1 to which is fixedly attached the two shaft supporting plates 4 on which is mounted on the axle shaft 3 on which in turn is mounted the assembly consisting of the rubber tired wheels 10 and the elongated cylinder wheel 18. Slots 34 are provided in the shaft supporting plates 4 for the mounting of axle shaft 3.

A rear view of the invention is illustrated in FIG. 3 looking in the direction of A of FIG. 1. This view shows the back supporting plate 5 to which is mounted the 90° rotatable levers 30 and 31 which are fixedly attached to frame 1 by the pivot bolts 33. This view in FIG. 3 show the rotatable levers 30 and 31 in folded position such as when the device is not standing in vertical position. FIG. 3 also illustrates a rear view of the mounting of the assembly consisting of rubber tired wheels 10, the elongated cylinder wheel 18, the axle shaft 3 on the shaft supporting plates 4. The shaft 3 is locked to the shaft supporting plates 4 by slots at each end of axle shaft 3 so the axle can slide into grooves of shaft supporting plate 4.

Another rear view of the device is illustrated in FIG. 4, this view illustrates the rotatable levers 30 and 31 in extended position which provide in conjunction with the rubber tired wheels 10 a base of the device to be stored or stand in a vertical position with the surfboard 7 mounted thereon. FIG. 4 also illustrates the location of the shaft supporting plates 4 with the axle shaft 3 mounted thereon the view also shows the location of the cotter-pin fastened hexagon nut 29 to the shaft further preventing the rotation of the axle shaft 3.

The assembly consisting of the axle shaft 3, the rubber tired wheels 10, the elongated cylinder wheel 18 which is fixedly attached to the rubber-tired wheels 10, and the axle shaft 3 is clearly illustrated in FIG. 5.

A sectional view of the elongated cylinder wheel 18 at C—C is illustrated in FIG. 6.

The device illustrating the means of attaching the main frame 1 to any well known luggage carrier 37 is shown in FIG. 7 on the top of an automobile. The frame 1 is secured to the luggage carrier 37 with straps 13 as shown in FIG. 2. The view also show the top support plate 32 as well as the already described rotatable levers 30 and 31 as well as its pivot retaining bolt 33.

An optional or alternate means for soft sand travel of the device is illustrated in FIGS. 8 and 9 which utilizes a skid or slide plate 40 so that the device can skid or slide over sand surfaces instead of the rotatable elongated cylinder wheel 18 described in FIG. 6.

To better illustrate the means for skidding or sliding over sand surfaces an enlarged view of the wheeled end of the device shown in FIG. 7 is shown in FIG. 8. The enlarged view of FIG. 8 shows the shaft supporting plates 36, the wheels 10, the top support plate 32, the rotatable lever 31 and the pivot bolt 33 as well as the back supporting plate 5, it also shows a portion of the main frame 1. The shaft supporting plate 36 is illustrated with a part cut-away and is designated as 36a, also the rubber tired wheel 10 is illustrated with part cut away and is designated as 10a. These parts are shown in cut away form so as to illustrate the mounting of the skid or slide plate 40.

A front view of the optional means of the wheeled end of the device is illustrated in FIG. 9 looking in the direction of B in FIG. 8. Shown in FIG. 9 is the back supporting plate 5, the the rotatable levers 30 and 31 and the main frame 1. To strengthen the main frame 1 which is comprised of tubing there is inserted solid round stock 44 of FIG. 9 equal to the width of shaft supporting plates 36, this serves the purpose of reinforcing the main shaft tubing 1 for welding attachment to the angle supporting brackets 35 of FIG. 9.

The mounting of rubber-tired wheels 10 on the axle shaft 3 is separated from the shaft supporting plates 36 by spacer washers 39 FIG. 9. Spacer washers 42 are also installed between the rubber-tired wheels 10 and the hexagon nuts 28. The ends of the axle shaft 3 after assembly are burred to further prevent the hexagon nuts 28 from rotating off the shaft 3.

The skid or slide plate 40 is illustrated best in FIG. 9. The skid or slide plate are rolled around the outside two supporting rods 41 further shown in FIG. 8. Thus the skid or slide plate 40 permits the device with the surfboard 7 mounted on main frame to travel over soft sand surfaces.

It is to be noted the above description of the invention introduces the inovation of a surfboard carrier utilizing narrow rubber tired wheels for hard surface travel in combination with means for soft sand travel of the device to and from its destination, and in addition the device provides safe storage protection for the surfboard in its storage location or at all times when the surfboard in not in the water.

While the forms of apparatus herein described constitute preferred embodiments of the invention, it is to be understood that the invention is not to be limied to these precise forms of apparatus or applications, and that changes may be made therein without departing from the scope of the invention which is defined in the appended claims.

What I claim is:

1. A surfboard carrying device adaptable for safe storage and preservation of a surfboard as well as transportation means to and from the sea water's edge; comprising in combination:
    (a) an elongated lightweight metal tubular frame shaped exclusively for the mounting of a surfboard thereon;
    (b) said tubular frame arched at the forward end of the device thus providing a pulling handle;
    (c) said tubular frame fixedly attached to angle mounting brackets at the rear of said tubular frame;
    (d) axle supporting plates fixedly attached to said angle mounting brackets;
    (e) a top cross plate and a rear cross plate fixedly secured to said angle mounting brackets;
    (f) said axle supporting plates having openings through which said axle is mounted, and means preventing the axle from rotating within said openings;
    (g) a wheel assembly comprising two rubber tired wheels freely rotatable around said axle which is fixedly secured to said axle supporting plates, thus preventing rotation of said axle in relation to the axle supporting plates;
    (h) a skid plate fixedly secured around the lower portion of said axle supporting plates permitting the surfboard carrying device to skid over soft surfaces;
    (i) a plurality of cross plates fixedly secured to the top of said tubular frame and upon which resilient supporting pads are affixed for the protection of a surfboard;
    (j) strapping means for securing a surfboard to said tubular frame;
    (k) a pair of angled levers, adjustably rotatable 90° from their folded horizontal positions to their vertical position in relation to the axis of the said tubular frame of the device, said levers are pivoted to inserts affixed within the open ends of said tubular frame, said levers, are in folded position at all times except when an upright or standing position is desired, then in such instances the levers, are rotated to their 90° extended position, said levers, in extended position and in combination with said wheels provide a suitable base allowing the surfboard carrying device to stand in an upright vertical position in relation to the ground;

(l) said surfboard carrying device with a surfboard mounted thereon is adaptable to be strapped to any already known luggage carrier for mounting atop of an automobile.

2. A surfboard carrying device defined in claim 1, wherein, a surfboard is included as a component in the combination of components.

3. A surfboard carrying device adapted for safe storage and preservation of a surfboard as well as transportation means to and from the sea water's edge and adapted to be secured to an automobile top luggage rack, comprising in combination:

(a) an elongated lightweight metal tubular U-shaped frame having legs and a bight portion for mounting of a surfboard thereon;

(b) the bight portion of said tubular frame, thus providing a pulling handle;

(c) axle supporting plates attached to the end portions of said legs and extending outwardly from one side of said frame;

(d) said axle supporting plates including aligned openings and an axle non-rotatively secured within said openings;

(e) a wheel assembly rotatively mounted on said axle and including two narrow rubber tired wheels and a lightweight wide cylindrical member having a smaller diameter than said wheels and fixedly secured to said wheels;

(f) a plurality of cross plates secured to the other side of said frame;

(g) a pair of angled levers pivotally mounted to inserts affixed within the open ends of said U-shaped frame for pivotal 90° rotation in relation to said other side of frame for supporting said device in a vertical position;

(h) resilient pads secured to said cross plates for supporting a surfboard;

(i) and strap means for securing a surfboard to said device;

(j) a pair of angled levers, or arms, adjustably rotatable 90° from their folded horizontal position to their vertical extended position in relation to the axis of the said tubular frame of the device, said levers, or arms, are pivoted to inserts affixed within the open ends of said tubular frame, said levers, or arms, are in folded position at all times except when an upright or standing position is desired; then in such instances the levers or arms are rotated 90° to their extended position, said levers or arms in such extended position in combination with said wheels provide a suitable base, enabling the surfboard carrying device to stand in an upright vertical position;

(k) said surfboard carrying device with surfboard mounted thereon is adaptable to be strapped to any already known luggage carrier for mounting atop of an automobile.

4. A surfboard and surfboard carrying device adapted for safe storage and preservation of a surfboard as well as transportation means to and from the sea water's edge and adapted to be secured to an automobile top luggage rack, comprising in combination:

(a) an elongated lightweight aluminum tubular U-shaped frame having legs and a bight portion for mounting of a surfboard thereon;

(b) the bight portion of said tubular frame thus forming a pulling handle;

(c) axle supporting plates attached to end portions of said legs and extending outwardly from one side of said frame;

(d) said axle supporting plates including aligned openings and an axle non-rotatively secured within said openings;

(e) a wheel assembly rotatively mounted on said axle and including two narrow rubber tired wheels and a lightweight wide cylindrical member having a smaller diameter than said wheels and fixedly secured to said wheels;

(f) a plurality of cross plates secured to the other side of said frame;

(g) a pair of angled levers pivotally mounted to inserts affixed within the open ends of said U-shaped frame for pivotal 90° rotation in relation to said other side of frame for supporting said device in a vertical position;

(h) resilient pads secured to said cross plates for supporting said surfboard;

(i) strap means for securing said surfboard to said device;

(k) and a surfboard carried by said device.

5. A surfboard carrying device adapted for safe storage and preservation of a surfboard as well as transportation means to and from the sea water's edge and adapted to be secured to an automobile top luggage rack, comprising in combination:

(a) an elongated lightweight aluminum tubular U-shaped frame having legs and a bight portion for mounting of a surfboard thereon;

(b) the bight portion of said tubular frame thus forming a pulling handle;

(c) axle supporting plates attached to the end portions of said legs and extending outwardly from one side of said frame;

(d) said axle supporting plates including aligned openings and an axle non-rotatively secured within said openings;

(e) lightweight elongated wide area means having a curvilinear surface extendible between two rubber tired wheels and mounted to said device to prevent said two rubber tired wheels sinking more than one inch into soft ground surfaces;

(f) a plurality of cross plates secured to the other side of said frame;

(g) a pair of angled levers pivotally mounted to inserts affixed within the open ends of said U-shaped frame for pivotal 90° rotation in relation to said other side of frame for supporting said device in a vertical position;

(h) resilient pads secured to said cross plates for supporting a surfboard;

(i) and strap means for securing a surfboard to said device.

6. A surfboard and surfboard carrying device adapted for safe storage and preservation of a surfboard as well as transportation means to and from the sea water's edge and adapted to be secured to an automobile top luggage rack, comprising in combination;

(a) an elongated lightweight aluminum tubular U-shaped frame having legs and a bight portion for mounting of a surfboard thereon;

(b) the bight portion of said tubular frame thus forming a pulling handle;

(c) axle supporting plates attached to the end portions of said legs and extending outwardly from one side of said frame;

(d) said axle supporting plates including aligned openings and an axle non-rotatively secured within said openings;

(e) lightweight elongated wide area means having a curvilinear surface extendable between two rubber tired wheels and mounted to said device to prevent said two rubber tired wheels sinking more than one inch into soft ground surfaces;

(f) a plurality of cross plates secured to the other side of said frame;

(g) a pair of angled levers pivotally mounted to inserts affixed within the open ends of said U-shaped frame for pivotal 90° rotation in relation to said other side of said frame for supporting said device in a vertical position;

(h) resilient pads secured to said cross plates for supporting said surfboard;

(i) strap means for securing a surfboard to said device;

(k) and a surfboard carried by said device.

References Cited

UNITED STATES PATENTS

| D. 128,819 | 8/1941 | Gambs. |
| 2,868,559 | 1/1959 | Vincelette _____ 280—47.33 |
| 3,155,256 | 11/1964 | Cook. |

FOREIGN PATENTS

| 839,163 | 6/1960 | Great Britain. |

BENJAMIN HERSH, *Primary Examiner.*

L. D. MORRIS, *Assistant Examiner.*